United States Patent
Yotsuya

[19]

[11] Patent Number: 6,130,808
[45] Date of Patent: Oct. 10, 2000

[54] HOVERING-TYPE HEAD SLIDER AND MAGNETIC DISC DEVICE

[75] Inventor: Michio Yotsuya, Kanagawa, Japan

[73] Assignee: Sony Corporation, Tokyo, Japan

[21] Appl. No.: 08/910,648

[22] Filed: Aug. 13, 1997

[30] Foreign Application Priority Data

Aug. 19, 1996 [JP] Japan ................................ 8-235905

[51] Int. Cl.[7] .................................................... G11B 5/60
[52] U.S. Cl. .................................. 360/235.4; 360/235.6; 360/235.7; 360/236.1; 360/236.8; 360/235.5; 360/236.4; 360/236.5
[58] Field of Search .............................. 360/103, 235.4, 360/235.5, 235.7, 235.8, 236.1, 236.2, 236.3, 236.5, 236.6, 236.8, 237, 235.6, 236.4

[56] References Cited

U.S. PATENT DOCUMENTS 4,984,114  1/1991  Takeuchi et al. .................... 360/103
5,978,176  11/1999  Ezaki et al. ......................... 360/103
6,023,394  2/2000  Ito et al. ............................. 360/103

*Primary Examiner*—Robert S. Tupper
*Attorney, Agent, or Firm*—Hill & Simpson

[57] ABSTRACT

Disclosed is a hovering-type head slider in which the variation in static hovering distance is reduced as much as possible, thereby making it possible to obtain a hovering distance which is constant with respect to variation in the skew angle and in the linear velocity.

The hovering-type head slider includes two rails 16 and 17 which are formed on either side portions of the surface thereof opposed to a recording medium and which serve as air bearing surfaces, a tapered portion provided on the air flow inlet side of each rail, and a magnetic head 15a provided on an end surface on the air flow out let side, wherein the rails 16 and 17 branched into branch rail portions which extend obliquely toward the air flow outlet end from a position near the center with respect to the direction of the air flow.

12 Claims, 17 Drawing Sheets

HOVERING-TYPE HEAD SLIDER AND MAGNETIC DISC DEVICE

BACKGROUND OF THE INVENTION

1. Field of the Invention

The present invention relates to a hovering-type head slider carrying a magnetic head for performing recording and reproduction on and from, for example, a magnetic disc or a magneto-optical disc, and to a magnetic disc device.

2. Description of the Related Art

FIG. 22 shows an example of the construction of a conventional hard disc drive device which is incorporated in or connected to a computer or the like.

In FIG. 22, a hard disc drive device 1 includes a casing 2 that is formed of an aluminum alloy or the like. A spindle motor (not shown) is arranged in a flat section of the casing 2. Further, there is provided a double-sided magnetic disc 3 which is rotated at a fixed angular velocity by this spindle motor.

Further, an arm 4 is mounted to the casing 2 so as to be swingable around a vertical axle 4a. A voice coil 5 is attached to one end of this arm 4, and a head slider 6 is attached to the other end thereof.

Magnets 7a and 7b are attached to the casing 2 such that the voice coil 5 is positioned between these magnets. The voice coil 5 and the magnets 7a and 7b constitute a voice coil motor 7.

When an electric current is supplied from outside to the voice coil 5, the arm 4 is rotated around the vertical axle 4a due to the force generated by the magnetic fields of the magnets 7a and 7b and the electric current flowing through the voice coil 5, whereby the head slider 6, which is attached to the other end of the arm 4, is moved substantially radially with respect to the magnetic disc 3, as indicated by arrows X in FIG. 23. As a result, a magnetic head 8 (See FIG. 24), which is provided on the head slider 6, performs a seek operation on the magnetic disc 3. In this way, information is recorded or reproduced on or from a predetermined track of the magnetic disc 3.

The head slider 6 is constructed as shown in FIG. 24. In FIG. 24, the bottom surface of the head slider, that is, that surface of the head slider which is to be opposed to the magnetic disc 3, is directed upwards. Rails 6a and 6b serving as air bearing surfaces are formed on either side portion of the lower surface of the head slider 6, which surface is one of the main surfaces of the head slider. Further, tapered portions 6c and 6d are provided at the air flow inlet ends of the rails 6a and 6b, whereby, when the head slider 6 is brought close to the surface of the magnetic disc 3 rotating in the direction of the arrow Y, as shown in FIG. 23, the head slider 6 receives a lift due to the air flow introduced into the gap between the rails 6a, 6b of the head slider 6 and the surface of the magnetic disc 3.

Due to this lift, the head slider 6 and the magnetic head 8, which is attached to this head slider 6, hover over the surface of the magnetic disc 3, keeping a minute distance (hovering distance) d from the surface of the magnetic disc 3, as shown in FIG. 25. Thus, damage due to wear of the magnetic disc 3, which would occur if the magnetic head 8 were in direct contact with the surface of the magnetic disc 3, can be prevented. Generally speaking, this hovering distance d is approximately 0.1 μm and, at the research level, approximately 0.05 μm.

In this hovering-type head slider 6, constructed as described above, even when the surface of the magnetic disc 3 has some surface irregularities, as shown in FIG. 25, the hovering distance d of the head slider 6 and the magnetic head 8 with respect to the same track as measured from the surface of the magnetic disc 3 can be kept substantially constant.

The hovering-type head slider 6, constructed as described above, however, has a problem in that the hovering distance of the hovering-type head slider 6 fluctuates, in other words, a so-called dynamic variation in the hovering distance occurs when an impact is applied to the magnetic disc 3 or when the hovering-type head slider 6 cannot sufficiently respond to surface irregularities, undulations, etc. of the magnetic disc 3.

Further, when the magnetic disc 3 is rotated at a fixed angular velocity, the linear velocity in the outer periphery of the disc is higher than the linear velocity in the inner periphery thereof. As a result, there is a relatively great amount of disparity in the hovering distance d of the slider 6 between the outer and inner peripheries of the magnetic disc 3. That is, the linear velocity in the outer periphery of the magnetic disc 3 is higher than the linear velocity in the inner periphery thereof, and the resultant hovering distances correspond to these linear velocities. As a result, a so-called static variation in hovering distance is generated.

When the arm 4 rotates around the vertical axle 4a, the head slider 6 makes not a linear but an arcuate movement with respect to the radial direction over the surface of the magnetic disc 3, as shown in FIG. 26. Thus, as shown in FIG. 27, the center line 6e of the head slider 6 is deviated from the tangential direction 3a of the track of the magnetic disc 3, and a so-called skew angle θs is generated. This skew angle θs varies in accordance with the distance from the center of the magnetic disc 3.

That is, when the skew angle θs increases, the efficiency in the conversion to the lift of the dynamic pressure between the surface of the magnetic disc 3 and the slider 6 is reduced, with the result that the hovering distance d is reduced.

Thus, the hovering distance d, which is larger in the outer periphery, decreases due to the skew angle θs. Here, the variation in the hovering distance d due to the linear velocity is linear, whereas the reduction in the hovering distance d due to the skew angle θs is quadratic and not linear. Thus, as long as the conventional slider 6 shown in FIG. 24 is used, it is difficult to have the requisite balance between the linear velocity and the skew angle θs over the entire radial range of the magnetic disc 3.

Thus, due to the mutual action of the above-mentioned static variation in hovering distance and the reduction in hovering distance attributable to the skew angle, the S/N at the time of recording/reproduction cannot be kept constant, so that it is impossible to perform accurate recording and reproduction on and from a desired track by means of the magnetic head 8.

In view of this, there has been proposed, for example, a head slider 9, which is, as shown in FIG. 28, equipped with hand-drum-shaped rails 6e and 6f that are formed so as to diverge toward both ends from a position near the center with respect to the direction of the air flow.

By using this head slider 9, constructed as described above, the entire length of each of the rails 6e and 6f contributes to the hovering of the head slider 9 with respect to an air flow having a skew angle θs. Thus, the reduction in the hovering distance when the skew angle θs is large is mitigated, with the result being that a hovering-distance characteristic which is relatively stable on the whole with respect to the variation in the skew angle can be obtained.

However, in the above head slider 9, which is equipped with the hand-drum-shaped rails 6e and 6f, it is impossible to completely eliminate the variation in the hovering distance when the skew angle θs is zero since the lift then generated by the air flow is excessively large.

Thus, as described above, the distance between (the head slider 9 and the magnetic head 8) and the magnetic disc 3, that is, the spacing, fluctuates even in the case of a slight variation in the hovering distance since nowadays the hovering distance is as small as approximately 0.1 μm, with the result being that the spacing loss is not constant. Thus, it is impossible to utilize the performance of the magnetic disc to the utmost. Further, in extreme cases, the magnetic head comes into contact with the surface of the magnetic disc 3, thereby damaging the recorded data.

SUMMARY OF THE INVENTION

In view of the above problems in the prior art, it is an object of the present invention to provide a hovering-type head slider in which the static variation in the hovering distance is reduced as much as possible, whereby a constant hovering distance is obtained over the entire range of the data zone of the magnetic disc.

To achieve the above object, there is provided, in accordance with the present invention, a hovering-type head slider comprising: at least two rails serving as air bearing surfaces formed substantially in parallel to a surface opposed to a recording medium; a tapered portion or step portion provided on the air-flow inlet side of each rail; and a magnetic head provided on an end surface on the air-flow outlet side, wherein the above-mentioned rails are branched into at least two rail portions from a position near the center with respect to the direction of the air flow toward the air-flow outlet end.

In the above-described construction, the air flow introduced from the air-flow inlet end flows between the surfaces of the rails serving as air bearing surfaces and the surface of the recording medium, whereby a lift due to positive pressure is generated. Further, the air flows between the portion surrounded by the step portions or tapered portions and the rails (i.e., the recessed portion) and the surface of the recording medium, whereby at least a part of this recessed portion acts as a negative pressure zone, and rapidly expands to thereby generate a sucking force due to negative pressure. As a result, the head slider hovers at a predetermined hovering distance as measured from the recording medium due to the balance between the lift and the sucking force.

The skew angle differs between the inner periphery and the outer periphery of the recording medium. In the hovering-type head slider of the present invention, each rail is formed so as to be branched into a plurality of branch rail portions, so that when there is a skew angle, the air flow advances along one group of branch portions extending obliquely. Thus, it is possible to obtain a sufficient lift. Further, when the skew angle is zero, the air flow advances along the portion of each rail which is not branched so that there is no concern that an excessive reduction in hovering distance will occur, whereby a relatively sufficient lift can be obtained.

The linear velocity differs between the inner periphery and the outer periphery of the recording medium. In the hovering-type head slider of the present invention, a recessed portion is formed between the rails, so that the lift is restrained by the sucking force generated by this recessed portion, whereby it is possible to achieve a reduction in dependence on the linear velocity of the hovering distance of the head slider.

In particular, in the case in which the rails on the front side with respect to the direction of the air flow are branched, the above-mentioned recessed portion effectively acts as a negative pressure zone, whereby it is possible to achieve a further reduction in dependence on the linear velocity of the hovering distance of the head slider.

DETAILED DESCRIPTION OF THE PREFERRED EMBODIMENT

A preferred embodiment of this invention will now be described in detail with reference to FIGS. 1 through 21.

The following embodiment, which is presented here as a preferred embodiment, is given in a form which is limited in various ways from the technical point of view. The scope of the present invention, however, is not restricted to this form unless particularly specified in the following description.

Figure 1:
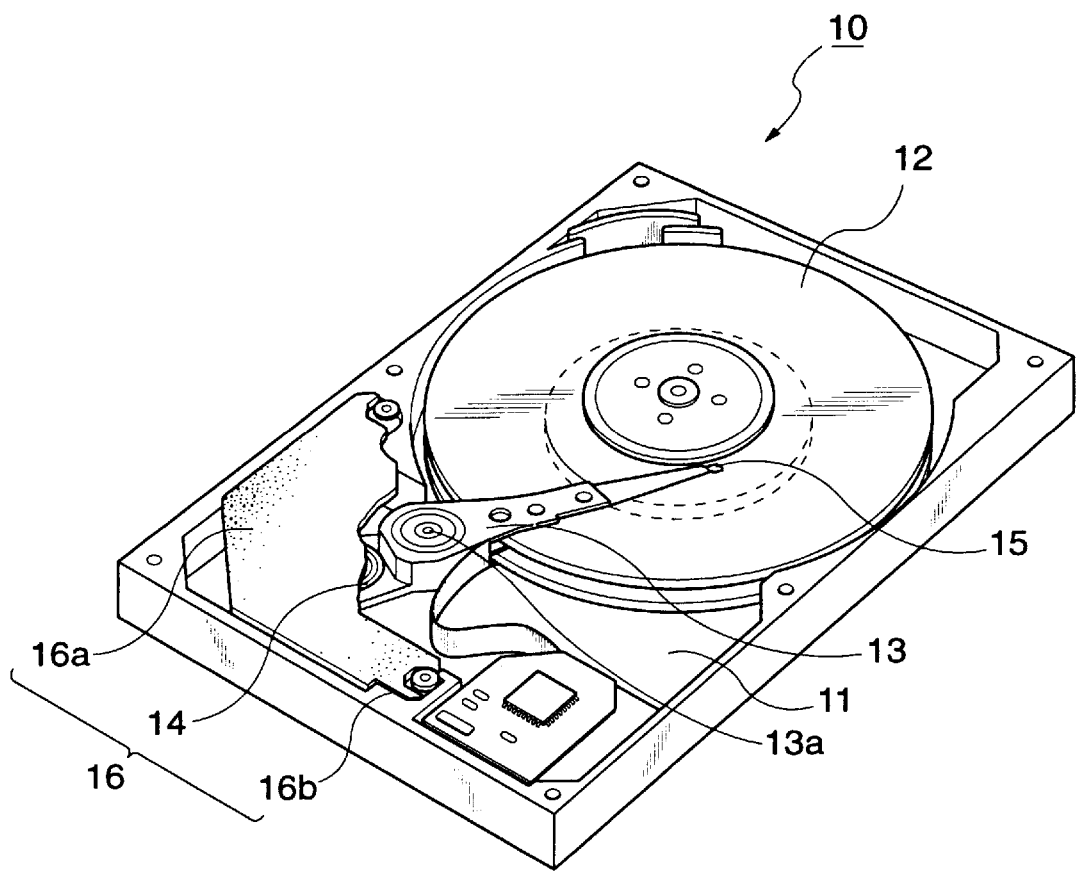
FIG. 1 is a perspective view showing the construction of a hard disc drive device in which a head slider according to the present invention is incorporated.

FIG. 1 shows the construction of a hard disc drive device to which a hovering-type head slider according to the present invention is mounted.

In FIG. 1, a hard disc drive device 10 has a casing 11 that is formed of an aluminum alloy or the like, and a spindle motor (not shown) is arranged in a flat portion of the casing 11. Further, there is provided a double-sided magnetic disc 12 which is rotated at a fixed angular velocity by this spindle motor.

Further, an arm 13 is mounted to this casing 11 so as to be swingable around a vertical axle 13a. A voice coil 14 is attached to one end of this arm 13, and a head slider 15 is attached to the other end of the arm 13.

Magnets 16a and 16b are mounted to the casing 11 such that the voice coil 14 is positioned between these magnets. The voice coil 14 and the magnets 16a and 16b constitute a voice coil motor 16.

When an electric current is supplied from outside to the voice coil 14, the arm 13 is rotated around the vertical axle 13a due to a force that is generated by the magnetic fields of the magnets 16a and 16b and the electric current flowing through the voice coil 14, whereby the head slider 15, which is attached to the other end of the arm 13, is moved substantially in a radial direction with respect to the magnetic disc 12. Thus, a magnetic head (not shown) provided on this head slider 15 performs a seek operation on the magnetic disc 12. In this way, information is recorded and reproduced on and from a predetermined track of the magnetic disc 12.

Figure 2:
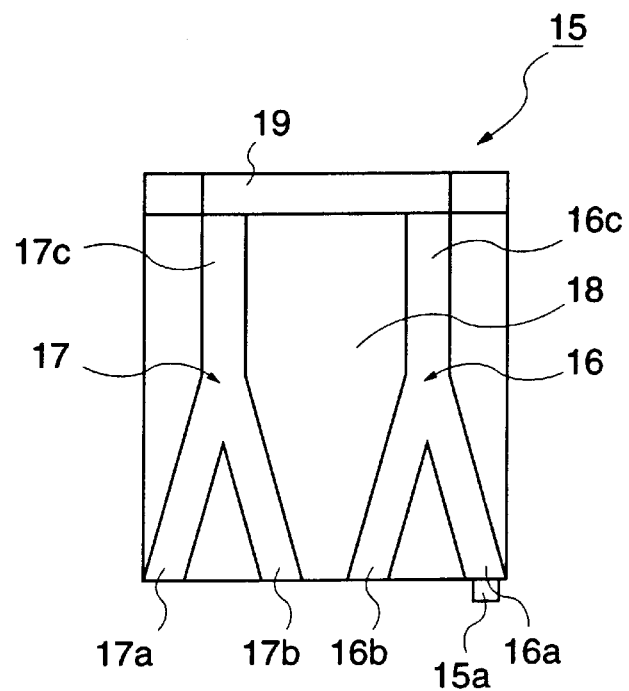
FIG. 2 is a schematic bottom view showing a hovering-type head slider according to a first embodiment of the present invention.
Figure 3:
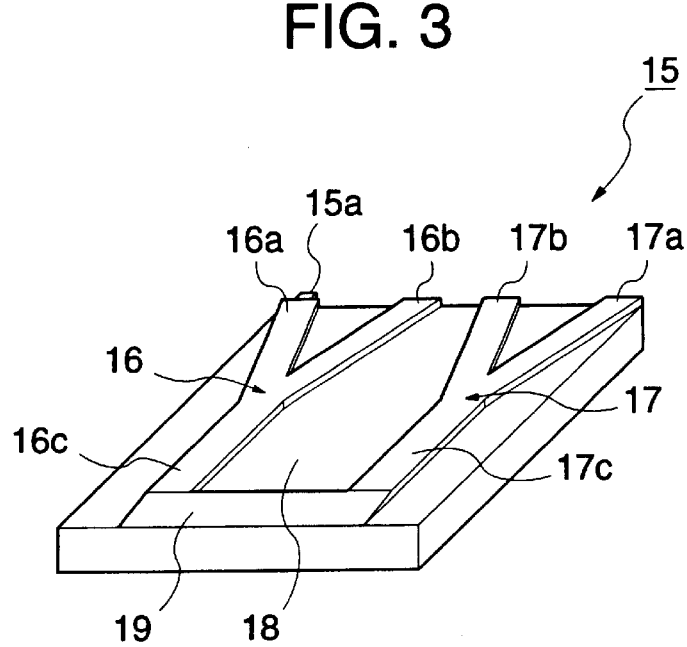
FIG. 3 is a schematic perspective view of the hovering-type head slider of FIG. 2.

FIGS. 2 and 3 show in detail the construction of a hovering-type head slider according to the first embodiment, that is, the hovering-type head slider 15.

FIGS. 2 and 3 are front views of that surface of the head slider which is opposed to the magnetic disc. In these drawings, the hovering-type head slider 15 is generally formed as a flat rectangular parallelopiped having on its lower surface two parallel rails 16 and 17 which serve as air bearing surfaces.

The rails 16 and 17 are arranged near either side of the lower surface of the head slider 15 such that the entire rails extend longitudinally from the air flow inlet side toward the air flow outlet side.

In the example shown, the rails 16 and 17 have branch portions 16a, 16b, 17a and 17b, which have the same width and extend obliquely toward the air flow outlet end from a position near the center with respect to the direction of the air flow, and straight non-branch portions 16c and 17c.

In this example, the portions 16a and 17a extend obliquely so as to be positioned on either side of the head slider at the air flow outlet end, and the portions 16b and 17b extend so as to be positioned in the middle of the head slider at the air flow outlet end.

In this case, the positions where the portions 16a, 16b, 17a and 17b are branched are at the center with respect to the direction of the air flow of the head slider 15.

Further, the head slider 15 has a tapered or step portion 19 (which is a tapered portion in the example shown) at the air flow inlet end of the lower surface thereof.

This tapered portion 19 is formed so as to be at a predetermined angle with respect to the surfaces of the rails 16 and 17 serving as air bearing surfaces. In the case of the example shown, the tapered portion 19 is provided in the area connecting the forward ends of the straight portions 16c and 17c of the rails 16 and 17.

That area of the lower surface of the head slider 15 which is between the rails 16 and 17 is formed as a recessed portion 17 having a predetermined depth and acting as a negative pressure zone.

When this hovering-type head slider 15 is brought close to the surface of a rotating magnetic disc 12, the air flow let in from the air flow inlet end of the hovering-type head slider 15 as the magnetic disc 12 rotates flows from the tapered portion 19 through the gap between the surface of the magnetic disc 12 and the rails 16 and 17 and, at the same time, through the gap between the magnetic disc 12 and the recessed portion 18 between the rails 16 and 17.

Due to the air flow between the magnetic disc and the rails 16 and 17, the hovering-type head slider 15 receives lift. The hovering distance between the disc and the rails 16 and 17 is normally approximately from 0.3 to 0.5 $\mu$m, whereas the hovering distance between the disc and the recessed portion 18 is, for example, approximately 5 $\mu$m, with the result being that the air flow expands rapidly in the recessed portion 18, thereby generating a sucking force due to negative pressure.

Thus, the head slider 15 and the magnetic head 15a, which is mounted to the air flow outlet end of the head slider 15, hover over the surface of the magnetic disc 12 due to the above lift and sucking force and the balance of the spring load of the suspension of the arm 13, keeping a predetermined minute distance (hovering distance) from the surface of the magnetic disc 12. In this way, the magnetic head 15a is prevented from coming into direct contact with the surface of the magnetic disc 12, whereby the magnetic disc is protected against damage due to wear.

The hovering distance of the hovering-type head slider 15 is determined by the linear velocity and skew angle at each point on the magnetic disc 12. In the hovering-type head slider 15, both the lift and the sucking force increase with the linear velocity, so that the dependence on the linear velocity of the hovering distance is restrained. Thus, the increase in the hovering distance near the outer periphery of the magnetic disc 12 is mitigated.

Figure 4:
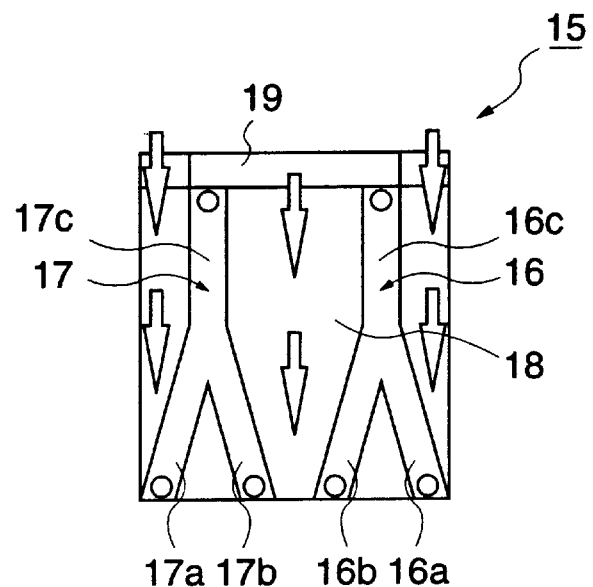
FIG. 4 is a schematic bottom view showing the air flow when the skew angle of the hovering-type head slider of FIG. 2 is zero.
Figure 5:
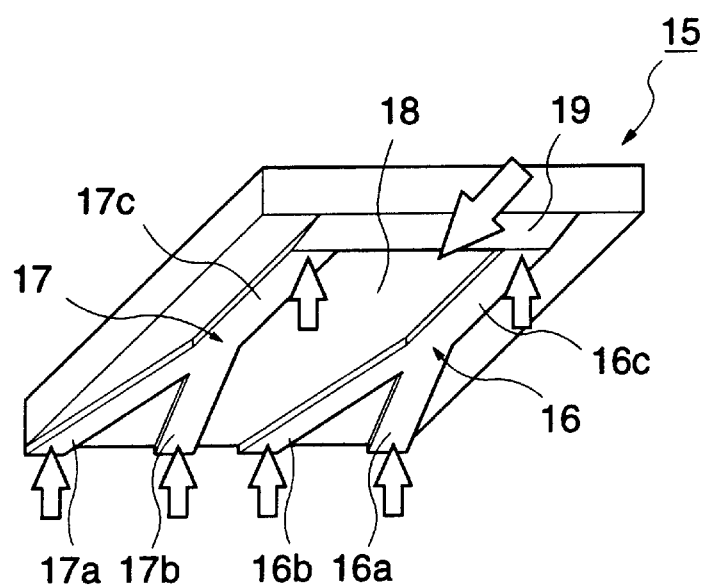
FIG. 5 is a schematic perspective view showing the air flow when the skew angle of the hovering-type head slider of FIG. 2 is zero.

When the skew angle θs is zero, the air flow enters the head slider 15 in a straight line with respect to the longitudinal dimension thereof, as indicated by arrows in FIGS. 4 and 5. The air flow, however, runs along the straight non-branch portions 16c and 17c of the rails 16 and 17. Thus, the air flow generates lift with respect to the portions 16c and 17c of the rails 16 and 17, whereby a sufficiently large lift is obtained.

Figure 6:
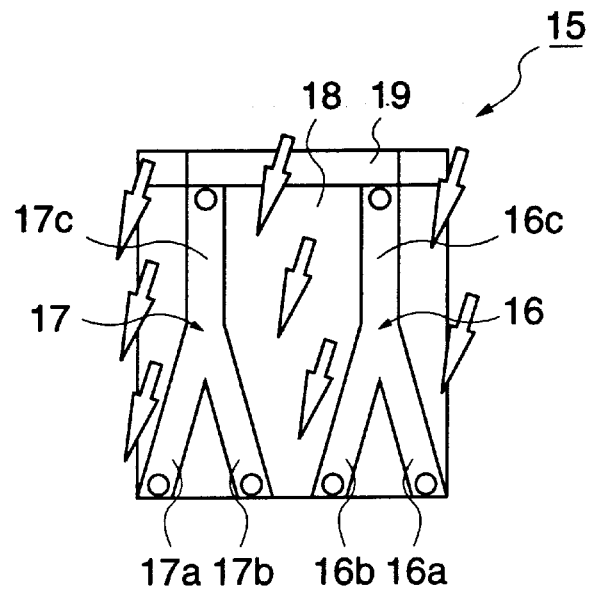
FIG. 6 is a schematic bottom view showing the air flow when there is a skew angle of the hovering-type head slider of FIG. 2.
Figure 7:
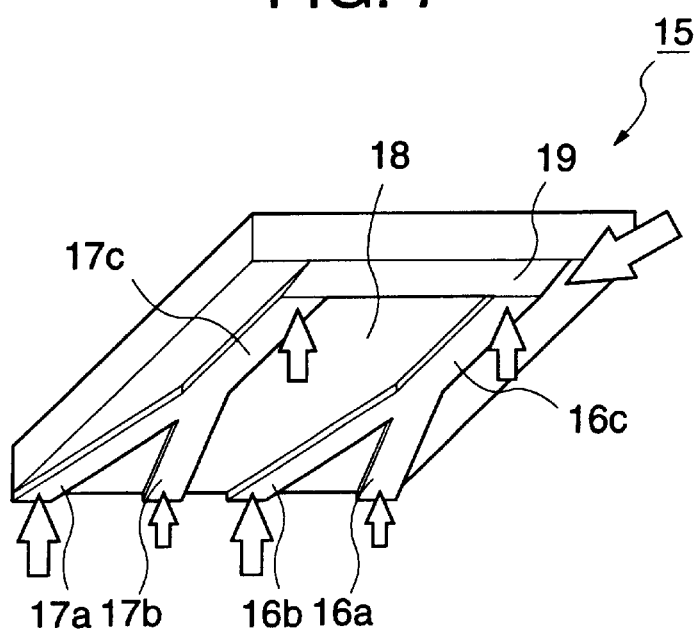
FIG. 7 is a schematic perspective view showing the air flow when there is a skew angle of the hovering-type head slider of FIG. 2.

When there is a skew angle, in contrast, the air flow runs along, for example, the portions 16b and 17a of the rails 16 and 17, as indicated by arrows in FIGS. 6 and 7. Thus, the air flow generates lift with respect to the portions 16b and 17a of the rails 16 and 17, whereby a sufficiently large lift is obtained.

In this way, the dependence on the skew angle of the hovering distance is restrained to a sufficient degree, whereby a variation in the hovering distance which is substantially constant with respect to the variation in the skew angle is obtained.

In this way, the dependence on the linear velocity and the dependence on the skew angle are mitigated, whereby the hovering distance of the head slider 15 is kept at a substantially fixed level. Thus, in the hard disc drive device 10, if the linear velocity and the skew angle of the head slider 15 vary continuously when head seek operation is performed from the inner periphery to the outer periphery, it is possible to obtain a substantially constant hovering distance.

Thus, in the above-described embodiment, the rails 16 and 17 are formed in an X-shaped configuration, whereby a satisfactory hovering property is obtained in the hard disc drive device 10.

Since the branch portions 16a, 16b, 17a and 17b of the rails 16 and 17 are arranged at the air flow outlet end, the recessed portion 18 defined between the rails 16 and 17 is large, so that the recessed portion 18 effectively acts as a negative pressure zone, whereby an improvement in terms of dependence on the linear velocity is effectively achieved.

Figure 8:
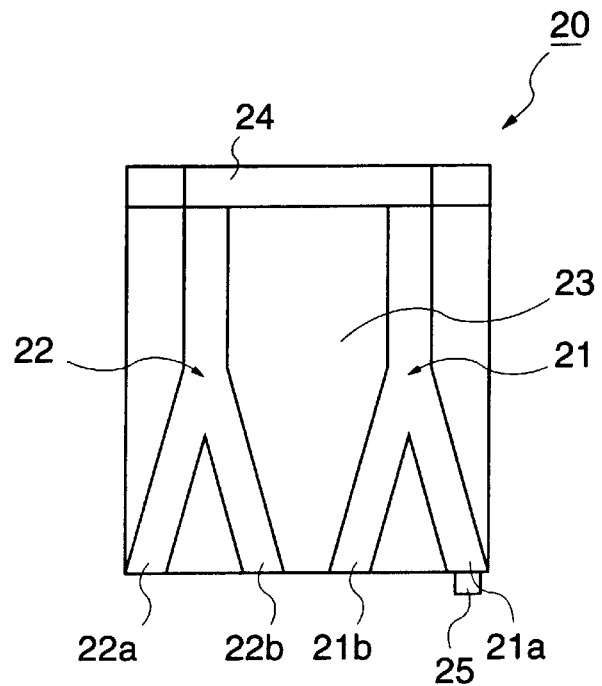
FIG. 8 is a schematic bottom view showing a hovering-type head slider according to a second embodiment of the present invention.
Figure 9:
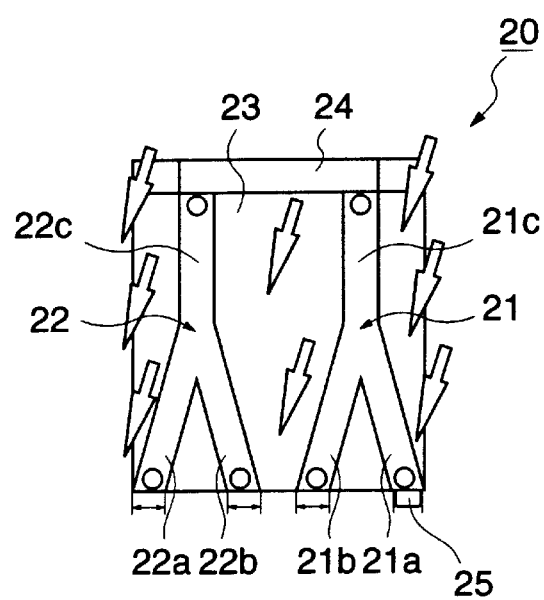
FIG. 9 is a schematic bottom view showing the air flow when there is a skew angle of the hovering-type head slider of FIG. 8.
Figure 10:
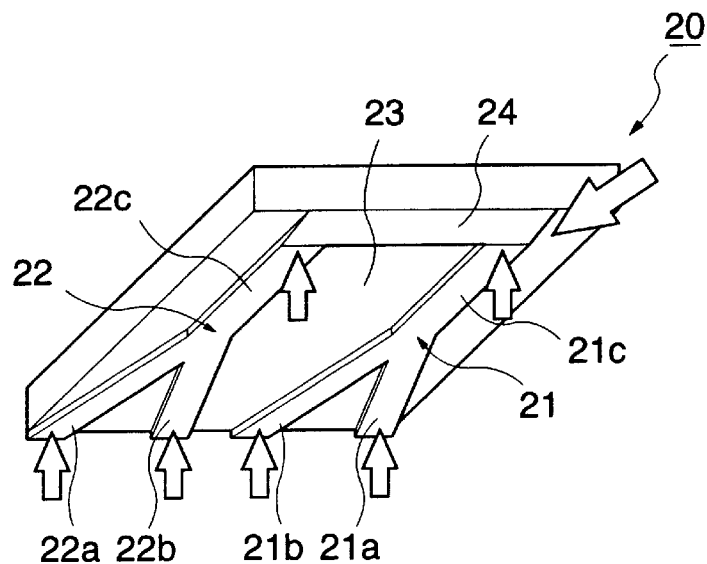
FIG. 10 is a schematic perspective view showing the air flow when there is a skew angle of the hovering-type head slider of FIG. 8.

FIG. 8 is a bottom view of a hovering-type head slider according to the second embodiment of the present invention.

In FIG. 8, a hovering-type head slider 20 is generally formed as a flat rectangular parallelopiped and has on the lower surface thereof two rails 21 and 22 acting as air bearing surfaces, a recessed portion 23 formed between the rails 21 and 22 and acting as a negative pressure zone, and a tapered or step portion (which is a tapered portion in the example shown) 24 formed at the forward end on the air flow inlet side of the rails.

The hovering-type head slider 20 is constructed substantially in the same way as the hovering-type head slider 15 shown in FIGS. 2 and 3 except that, while branch portions 21a and 22a of the rails 21 and 22 have the same width as that of the portions 16a and 17a of the above rails 16 and 17, branch portions 21b and 22b the rails 21 and 22 have a width larger than that of the portions 16b and 17b of the rails 16 and 17, that is, larger than that of the branch portions 21a and 22a.

This hovering-type head slider 20, constructed as described above, operates in the same way as the hovering-type head slider 15 shown in FIG. 2; the head slider 20 hovers with a magnetic head 25, which is attached to the air flow outlet end of the rail 21 of the head slider 20, due to the lift provided by the rails 21 and 22, keeping a minute distance (hovering distance) from the surface of the magnetic disc.

When the skew angle is zero, the roll amount of the hovering-type head slider 20 is remarkably reduced, and substantially reduced to zero, over the entire hovering range since the rails 21 and 22 are formed symmetrically with respect to the longitudinal central axis. of the rails 21 and 22, the portions 21a and 22b, which extend parallel to each other, and the portions 21b and 22a, which also extend parallel to each other, have different widths. Thus, when there is a skew angle, the air flow runs, for example, along the portions 21b and 22a of the rails 21 and 22 as indicated by arrows in FIGS. 9 and 10, so that the lift generated by the air flow on the right-hand side differs from that generated on the left-hand side. Thus, by appropriately selecting the width of the large-width portions 21b and 22b of the rails 21 and 22, the static roll of the hovering-type head slider 20 is restrained.

Thus, in the hard disc drive device 10, if the skew angle of the head slider 20 continuously varies when head seek operation is performed from the inner periphery to the outer periphery of the magnetic disc 12 of the hovering-type head slider 20, the roll amount of the hovering-type head slider 20 does not depend on the skew angle, and is substantially reduced to zero over the entire hovering range.

Figure 11:
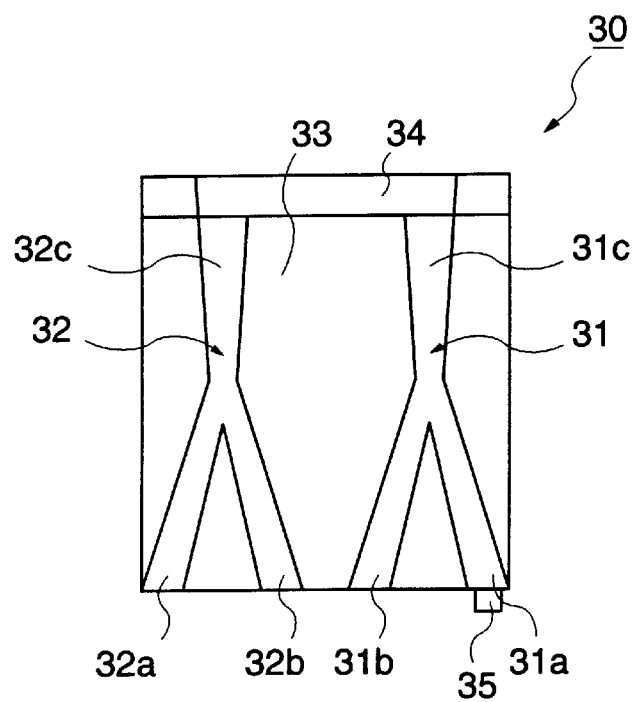
FIG. 11 is a schematic bottom view showing a hovering-type head slider according to a third embodiment of the present invention.

FIG. 11 is a bottom view of a hovering-type head slider according to the third embodiment of the present invention.

In FIG. 11, a hovering-type head slider 30 is generally formed as a flat rectangular parallelopiped, and has on the lower side thereof two rails 31 and 32 acting as air bearing surfaces, a recessed portion 33 formed between the rails 31 and 32 and acting as a negative pressure zone, and a tapered or step portion 34 formed at the forward end on the air flow inlet side of the rails 31 and 32.

The hovering-type head slider 30 is constructed substantially in the same way as the hovering-type head slider 15 shown in FIG. 2 except that branch portions 31a, 31b, 31c, 32a, 32b and 32c of the rails 31 and 32 are formed so as to gradually increase in width from the branching positions, which are near the longitudinal center of the head slider 30, toward the air flow inlet end the air flow outlet end.

The hovering-type head slider 30, constructed as described above, operates in the same way as the hovering-type head slider 15 shown in FIG. 2; the head slider 30 hovers over the surface of a magnetic disc with a magnetic head 35, which is attached to the air flow outlet end of the rail 31 of the head slider 30, due to the lift provided by the rails 31 and 32, keeping a minute distance (hovering distance) from the surface of the magnetic disc.

In this case, the portions 31a, 31b, 31c, 32a, 32b and 32c of the rails 31 and 32 are formed in a trapezoidal configuration so as to gradually increase in width toward the end portions, so that there is formed a part which generates positive pressure under dynamic pressure along the direction of the skew angle. Thus, a further improvement is achieved in terms of dependence on the skew angle.

Figure 12:
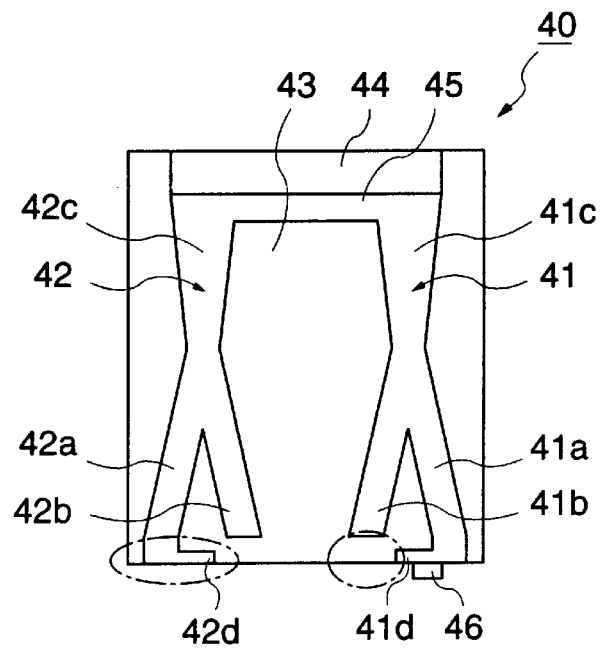
FIG. 12 is a schematic bottom view showing a hovering-type head slider according to a fourth embodiment of the present invention.

FIG. 12 is a bottom view of a hovering-type head slider according to the fourth embodiment of the present invention.

In FIG. 12, a hovering-type head slider 40 is generally formed as a flat rectangular parallelopiped and has on the lower side thereof two rails 41 and 42 serving as air bearing surfaces, a recessed portion 43 formed between the rails 41 and 42 and serving as a negative pressure zone, a tapered or step portion (which is a tapered portion in the example shown) 44 formed at the forward end on the air flow inlet side of the rails 41 and 42, and a cross rail 45 connecting the forward ends of the rails 41 and 42 and formed so as to be flush with them.

The hovering-type head slider 40 is constructed in substantially the same way as the hovering-type head slider 15 shown in FIG. 2 except for the following feature.

Straight portions 41c and 42c of the rails 41 and 42 are formed in a trapezoidal configuration gradually increasing in width toward the air flow inlet end, and outer branch portions 41a and 42a are extended laterally and inwardly at the air flow inlet end to form land portions 41d and 42d for carrying a magnetic head.

End portions of inner branch portions 41b and 42b are cut away at the air flow outlet end in order to avoid interference with the land portions 41d and 42d.

The hovering-type head slider 40, constructed as described above, operates in the same way as the hovering-type head slider 15 shown in FIG. 2; the head slider hovers over the surface of a magnetic disc due to the lift provided by the rails 41 and 42 and the cross rail 45 together with a magnetic head 46 attached to the air flow inlet end of the land portion 41d of the rail 41 of the head slider 40, keeping a minute distance (hovering distance) from the surface of the magnetic disc.

In this case, each of the straight portions of the rails 41 and 42 is formed in a trapezoidal configuration gradually increasing in width toward the air flow inlet end, so that, even when there is a skew angle, there is provided a portion generating dynamic pressure along it. Thus, a further improvement is achieved in terms of dependence on the skew angle.

Figure 13:
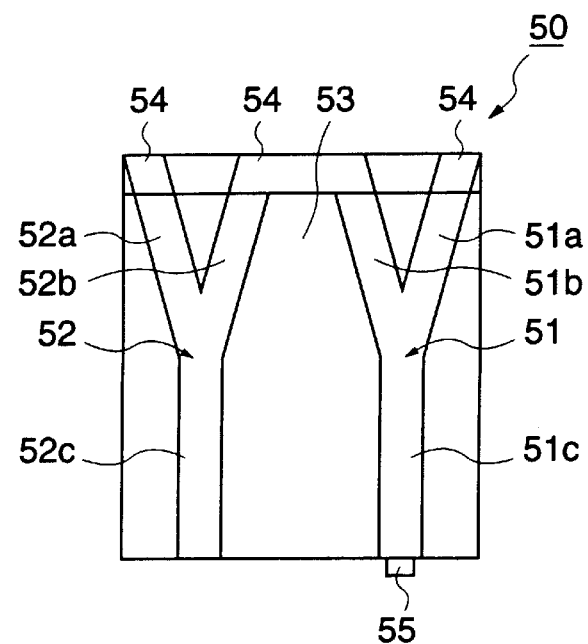
FIG. 13 is a schematic bottom view showing a hovering-type head slider according to a fifth embodiment of the present invention.

FIG. 13 is a bottom view of a hovering-type head slider according to the fifth embodiment of the present invention.

In FIG. 13, a hovering-type head slider 50 is generally formed as a flat rectangular parallelopiped, and has on the lower side thereof two rails 51 and 52 serving as air bearing surfaces, a recessed portion 53 formed between the rails 51 and 52 and serving as a negative pressure zone, and a tapered or step portion (which is a tapered portion in the example shown) 54.

Unlike the rails of the hovering-type head slider 15 shown in FIG. 2, the rails 51 and 52 of the hovering-type head slider 50 are equipped with branch portions 51a, 51b, 52a and 52b having the same width and obliquely extending from a section near the center with respect to the direction of the air flow toward the air flow inlet end, and straight non-branch portions 51c and 52c.

In this case, the portions 51a and 52a extend obliquely so as to be positioned on either side of the air flow inlet end, and the portions 51b and 52b extend obliquely so as to be positioned in the middle of the air flow outlet end.

The branching positions of the portions 51a, 51b, 52a and 52b are arranged at the center with respect to the direction of the air flow of the head slider 50.

In the example shown, the tapered portion 54 is provided in the areas corresponding to the forward ends of the branch portions 51a and 52a of the rails 51 and 52 and in the area connecting the forward ends of the branch portions 51b and 52b.

That is, compared with the hovering-type head slider 15 shown in FIG. 2, the branching positions of the rails of the hovering-type head slider 50 shown in FIG. 13 are varied.

The hovering-type head slider 50, constructed as described above, operates in the same way as the hovering-type head slider 15 shown in FIG. 2; the head slider 50 hovers over the surface of a magnetic disc due to the lift provided by the rails 51 and 52 together with a magnetic head 55 attached to the air flow outlet end of rail 51 of the head slider 50, keeping a minute distance (hovering distance) from the surface of the magnetic disc.

When the skew angle is zero, the air flow enters the head slider 50 in a straight line with respect to the longitudinal dimension thereof. The air flow runs along the straight non-branch portions 51c and 52c of the rails 51 and 52 to thereby generate lift, whereby a sufficiently large lift is obtained.

When there is a skew angle, the air flow runs along, for example, the portions 51b and 52a of the rails 51 and 52 to thereby generate lift, whereby, similarly, a sufficiently large lift is obtained.

Due to this arrangement, the dependence of the hovering distance on the skew angle is sufficiently restrained, whereby it is possible to obtain a variation in the hovering distance which is substantially constant with respect to the variation in the skew angle.

Since the branch portions 51a, 51b, 52a ad 52b of the rails 51 and 52 are arranged on the air flow inlet side, the branch portions 51a, 51b, 52a and 52b act effectively to generate positive pressure when there is a skew angle, whereby an improvement is effectively achieved in terms of the dependence of the hovering distance on the skew angle.

Figure 14:
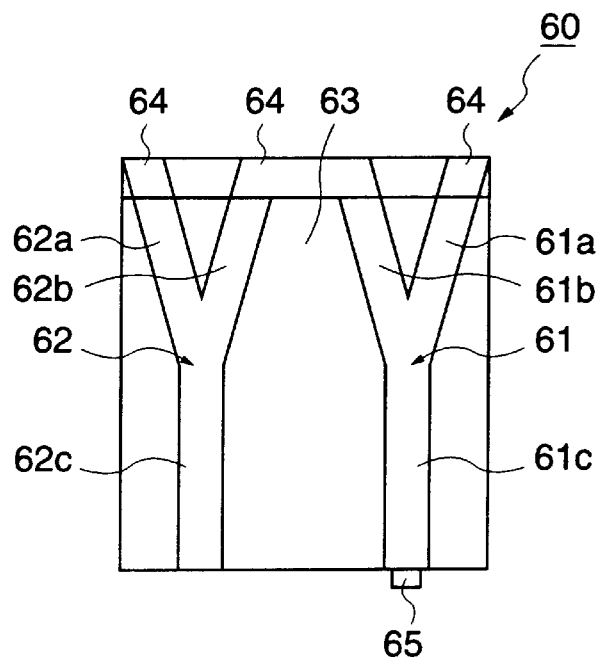
FIG. 14 is a schematic bottom view showing a hovering-type head slider according to a sixth embodiment of the present invention.

FIG. 14 is a bottom view of a hovering-type head slider according to the sixth embodiment of the present invention.

In FIG. 14, a hovering-type head slider 60 is generally formed as a flat rectangular parallelopiped and has on the lower side thereof two rails 61 and 62 serving as air bearing surfaces, a recessed portion 63 formed between the rails 61 and 62 and serving as a negative pressure zone, and a tapered or step portion (which is a tapered portion in the example shown) 64 formed at the forward end on the air flow inlet side of the rails.

The hovering-type head slider 60 is constructed substantially in the same manner as the hovering-type head slider 50 shown in FIG. 13 except that, of the obliquely extending branch portions of the rails 61 and 62, the inner branch portions 61b and 62b have a width larger than that of the outer branch portions 61a and 62a.

That is, the hovering-type head slider 60 of FIG. 14 is obtained by modifying the hovering-type head slider 20 of FIG. 8 in the rail branch portions.

The hovering-type head slider 60, constructed as described above, operates in the same manner as the hovering-type head slider 50 shown in FIG. 13; the head slider hovers over the surface of a magnetic disc due to the lift provided by the rails 61 and 62 together with a magnetic head 65 attached to the air flow outlet end of the rail 61 of the head slider 60, keeping a minute distance (hovering distance) from the surface of the magnetic disc.

Since the rails 61 and 62 are formed symmetrically with respect to the longitudinal center line of the head slider, the roll amount of the hovering-type head slider 60 when the skew angle is zero is markedly reduced over the entire hovering range; it is substantially reduced to zero.

When there is a skew angle, the air flow runs along, for example, the portions 61b ad 62a of the rails 61 and 62, so that the lift generated on the left-hand side by the air flow is different from that generated on the right-hand side. Thus, by appropriately selecting the width of the large width portions 61b and 62b of the rails 61 and 62, it is possible to restrain the static roll of the hovering-type head slider 60.

Figure 15:
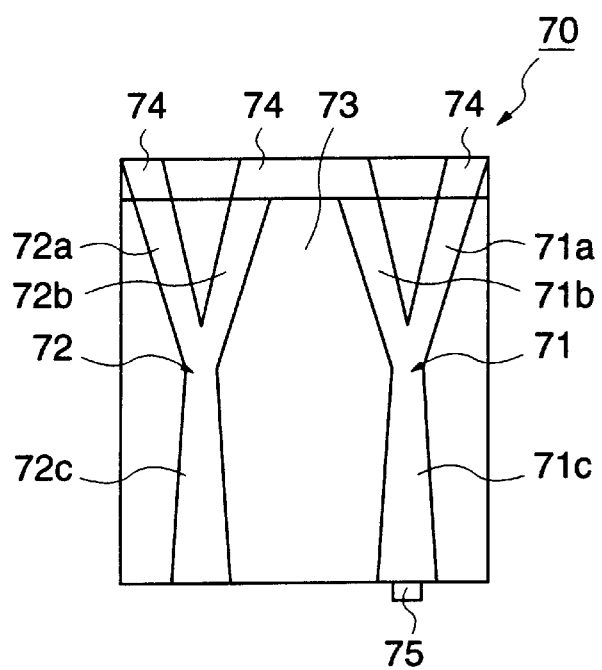
FIG. 15 is a schematic bottom view showing a hovering-type head slider according to a seventh embodiment of the present invention.

FIG. 15 is a bottom view of a hovering-type head slider according to the seventh embodiment of the present invention.

In FIG. 15, a hovering-type head slider 70 is generally formed as a flat rectangular parallelopiped and has on the lower side thereof two rails 71 and 72 serving as air bearing surfaces, a recessed portion 73 formed between the rails 71 and 72 and serving as a negative pressure zone, and a tapered or step portion (which is a tapered portion in the example shown) 74 formed at the forward end on the air flow inlet side of the rails.

The hovering-type head slider 70 is constructed substantially in the same way as the hovering-type head slider 50 shown in FIG. 13 except that obliquely extending branch portions 71a, 72b, 72a and 72b and straight non-branch portions 71c and 72c of the rails 71 and 72 are formed in a trapezoidal configuration to gradually increase in width from the branching position toward the air flow inlet end and the air flow outlet end.

That is, the hovering-type head slider 70 shown in FIG. 15 is obtained by modifying the hovering-type head slider 30 shown in FIG. 11 in the rail branching portion.

The hovering-type head slider 70, constructed as described above, operates in the same manner as the hovering-type head slider 50 shown in FIG. 13; the head slider 70 hovers over the surface of a magnetic disc due to the lift provided by the rails 71 and 72 together with a magnetic head 75 attached to the air flow outlet end of the rail 71 of the head slider 60, keeping a minute distance (hovering distance) from the surface of the magnetic disc.

Since the portions 71a, 71b, 71c, 72a, 72b and 72c of the rails 71 and 72 are formed in a trapezoidal configuration to gradually increase in width toward the ends, there is provided, even when there is a skew angle, a portion to receive corresponding dynamic pressure. Thus, a further improvement is achieved in terms of dependence on the skew angle.

Figure 16:
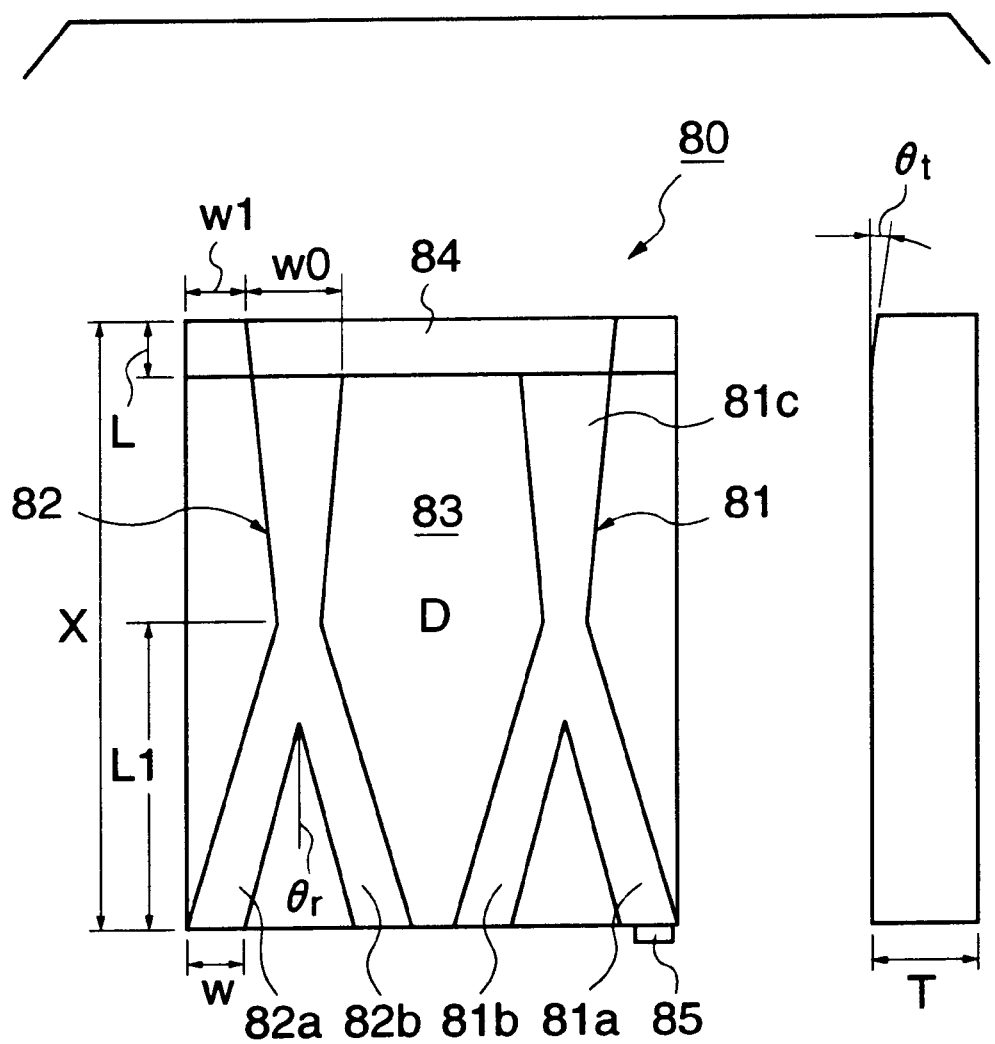
FIG. 16 is a schematic bottom view and side view showing a specific example of the formation of a hovering-type head slider according to the present invention.

FIG. 16 is a diagram showing a hovering-type head slider according to a specific embodiment of the present invention.

In FIG. 16, a hovering-type head slider 80, which is constructed substantially in the same way as the hovering-type head slider 30 shown in FIG. 11, is generally formed as a flat rectangular parallelopiped and has on the lower side thereof two rails 81 and 82 serving as air bearing surfaces, a recessed portion 83 formed between the rails 81 and 82 and serving as a negative pressure zone, and a tapered portion 84 formed at the forward end on the air flow inlet side of the rails 81 and 82.

The rails 81 and 82 are composed of branch portions 81a, 81b, 82a and 82b arranged near either side of the lower surface of the head slider 80, having the same width and extending in their entirety obliquely from a position near the center with respect to the direction of the air flow toward the air flow outlet end, and straight non-branch portions 81c and 82c extending straight toward the air flow inlet end so as to gradually increase in width.

The tapered portion 84 is formed so as to be at a predetermined gentle inclination angle θt of not larger than 1° with respect to the surfaces of the rails 81 and 82 serving as air bearing surfaces.

The head slider 80 has an entire length X of 2.05 mm, a thickness T of 0.43 mm, a taper length L of 0.2 mm, and a taper angle θt of 0.5°. The inclination angle θr of the portions 81a, 81b, 82a and 82b of the rails 81 and 82 is 15°; the width W of the portions 81a, 81b, 82a and 82b of the rails 81 and 82 is 0.15 mm; the width W0 of the end portions on the air flow outlet side of the portions 81c and 82c is 0.4 mm; the distance L0 between the rails 81, 82 and the air flow outlet end is 1.025 mm; and the depth D of the recessed portion 83 is 0.006 mm. A magnetic head 85 is attached, for example, to the air flow output end of the portion 81a of the rail 81.

The hovering-type head slider 80, constructed as described above, was mounted, for example, in a 3.5 inch. hard disc drive device, and the variation in the hovering distance with respect to the linear velocity, and the variation in the hovering distance and the roll amount with respect to the skew angle were computed by computer simulation. Symbol A in FIGS. 19, 20 and 21 indicates the variation in the hovering distance with respect to the linear velocity, the variation in the hovering distance with respect to the skew angle, and the variation in the roll amount with respect to the skew angle, respectively.

Figure 19:
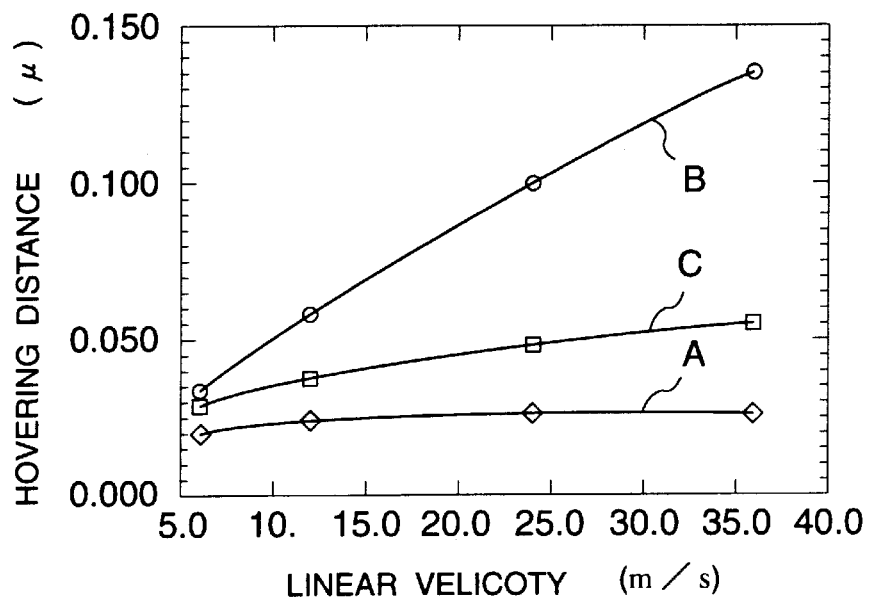
FIG. 19 is a graph showing the relationship between the linear velocity and the hovering distance in the hovering-type head slider of FIGS. 11 through 13 as obtained through computer simulation.
Figure 20:
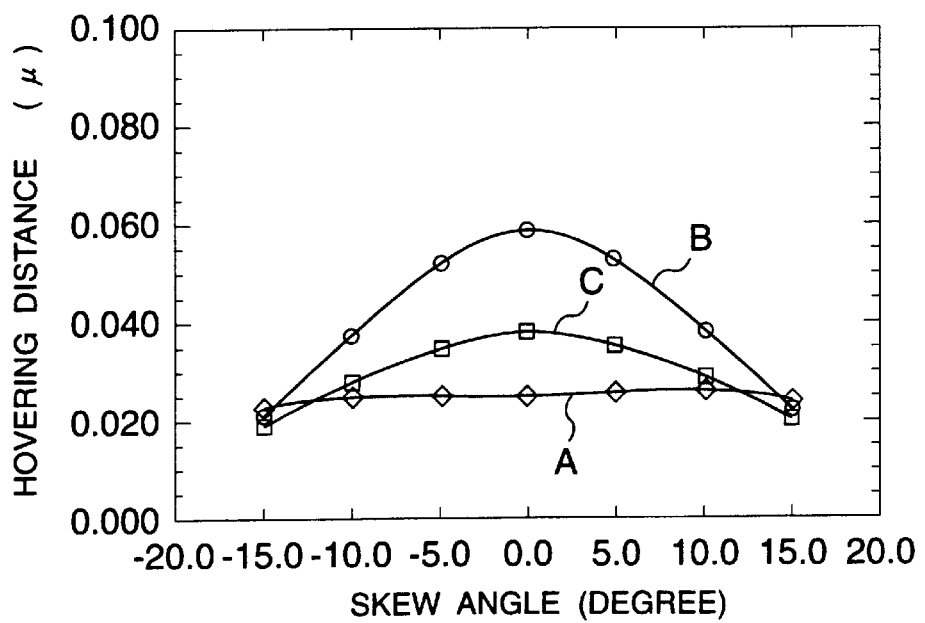
FIG. 20 is a graph showing the relationship between the skew angle and the hovering distance in the hovering-type head slider of FIGS. 11 through 14 as obtained through computer simulation.
Figure 21:
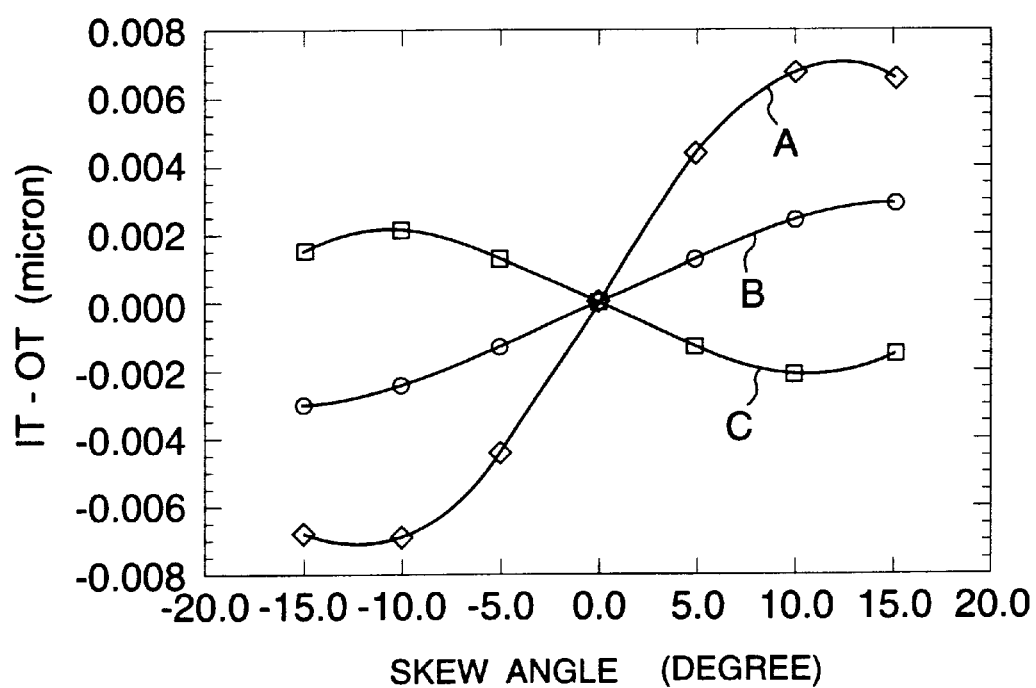
FIG. 21 is a graph showing the relationship between the skew angle and the roll amount in the hovering-type head slider of FIGS. 11 through 13 as obtained through computer simulation.
Figure 22:
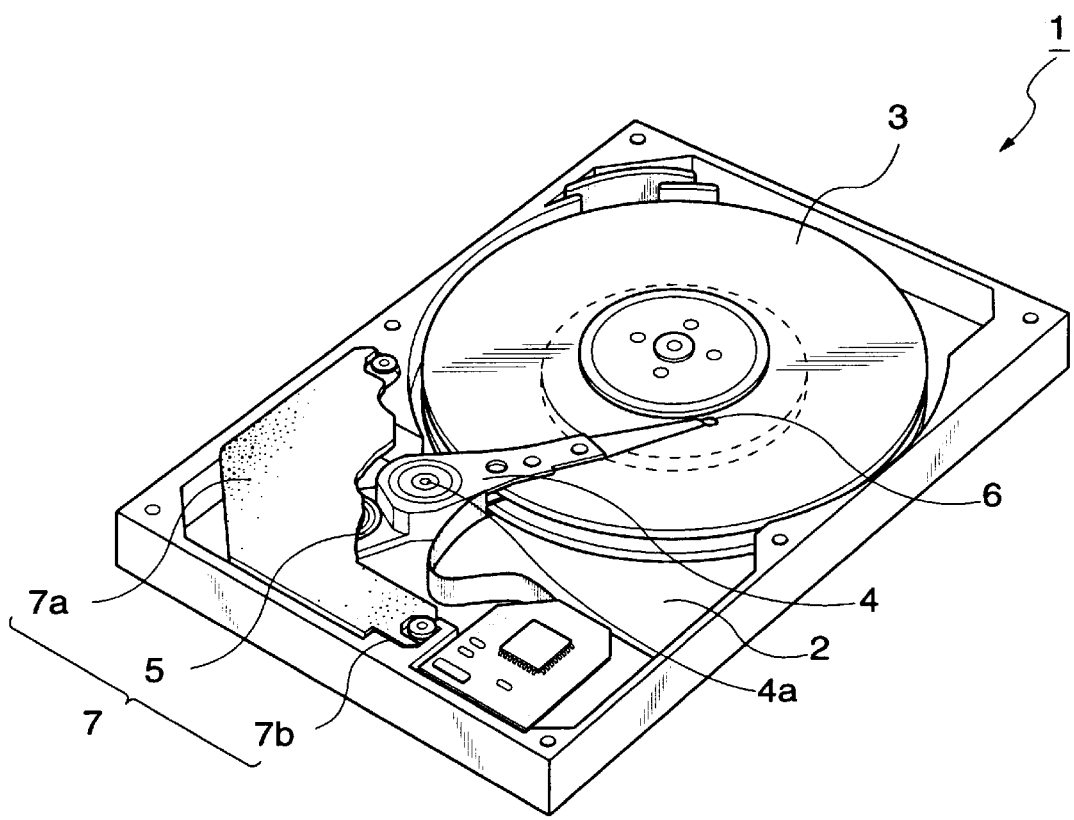
FIG. 22 is a perspective view showing an example of the construction of a conventional hard disc drive device.
Figure 23:
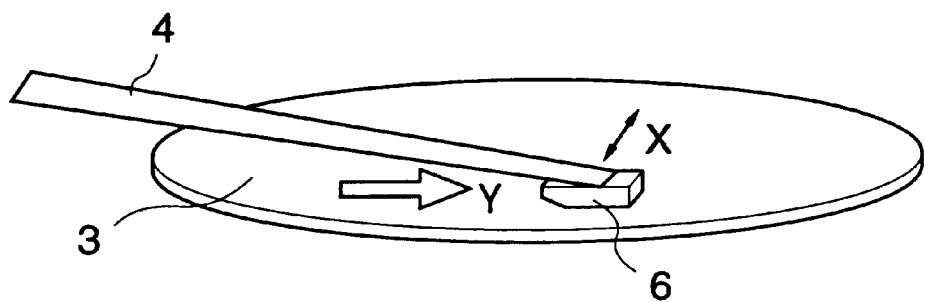
FIG. 23 is a schematic perspective view showing the relationship between the magnetic disc and the arm in the hard disc drive device of FIG. 22.
Figure 24:
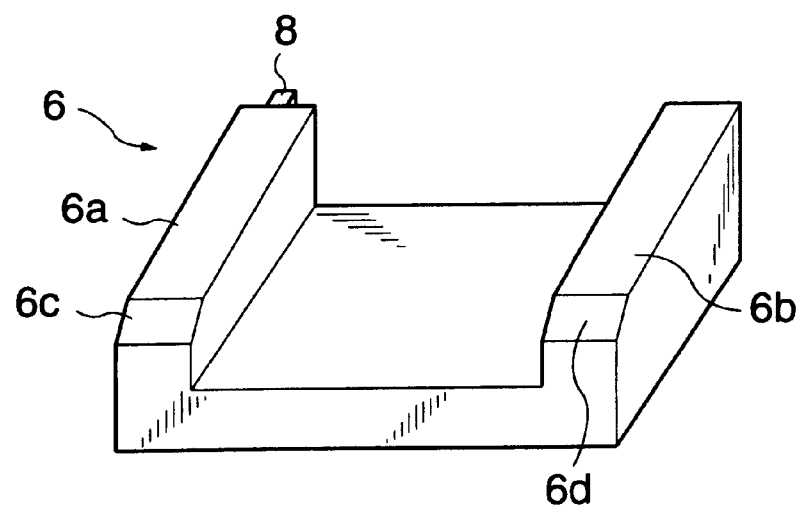
FIG. 24 is a schematic perspective view showing the hovering-type head slider in the hard disc drive device of FIG. 22.
Figure 25:
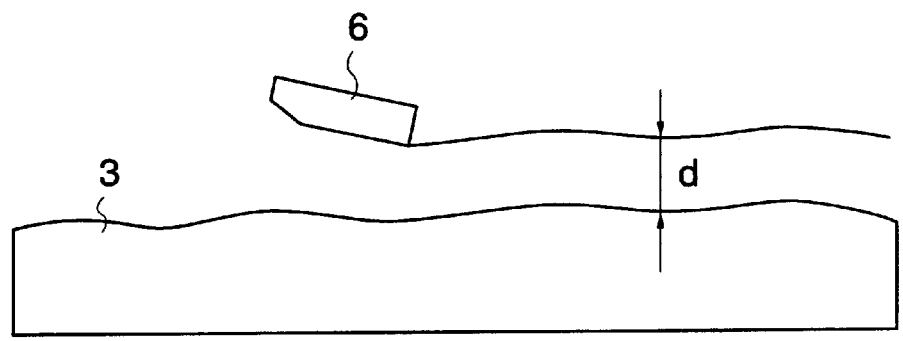
FIG. 25 is a schematic diagram showing the hovering-type head slider of FIG. 24 in the hovering state.
Figure 26:
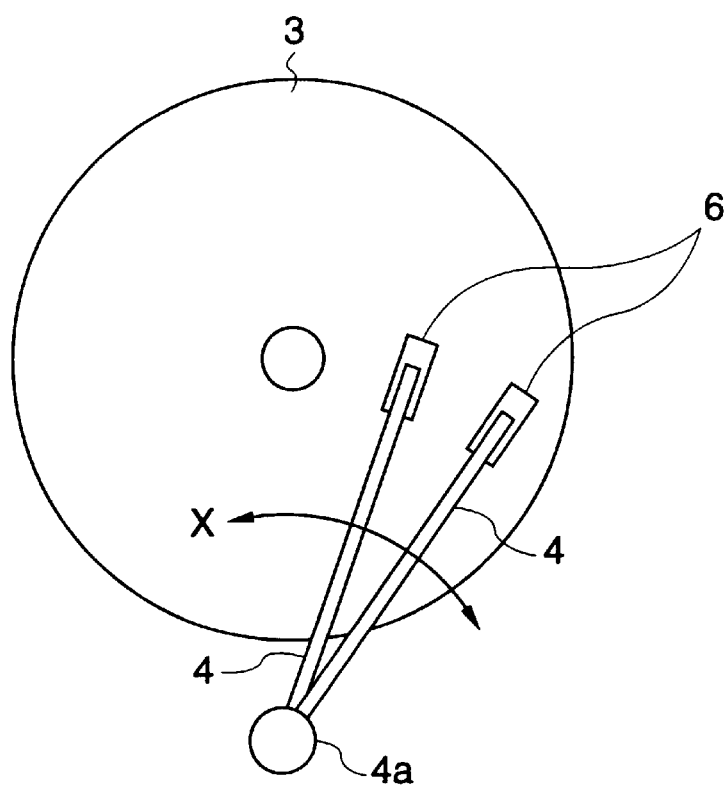
FIG. 26 is a schematic plan view showing how the arm of FIG. 23 performs a seek operation on a magnetic disc.
Figure 27:
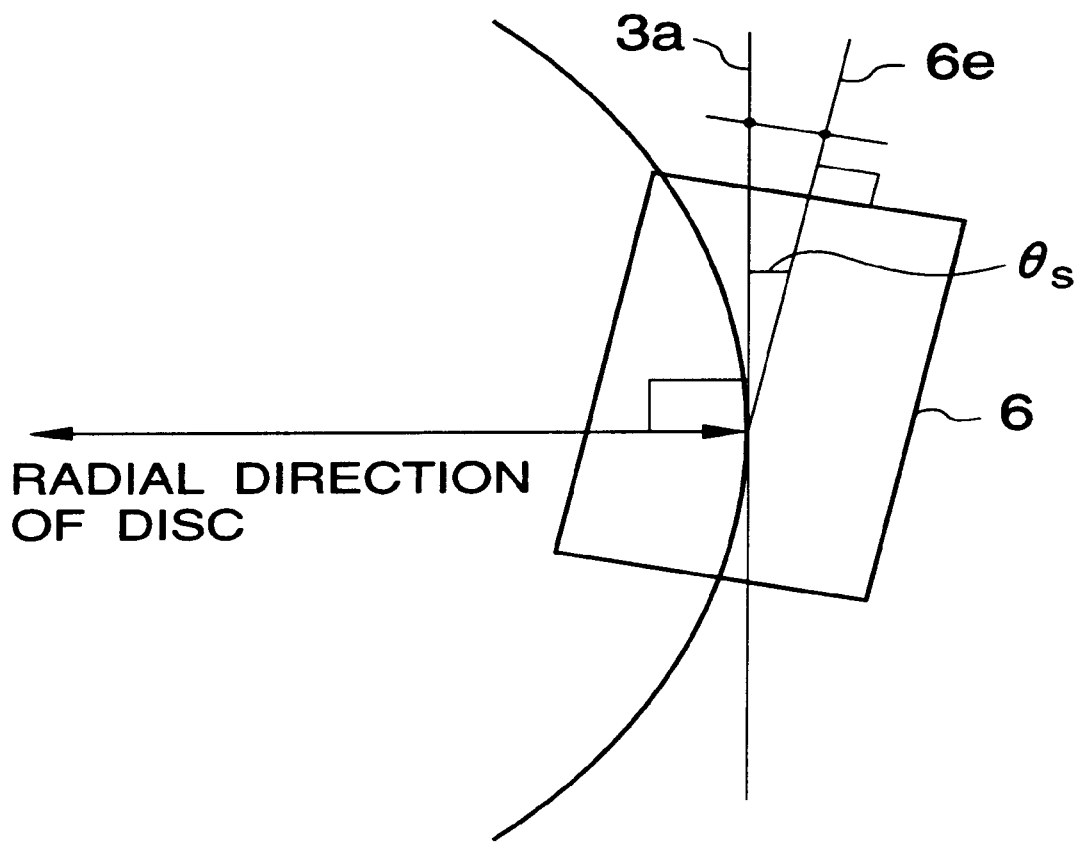
FIG. 27 is a schematic diagram showing the skew angle of the hovering-type head slider during the seek operation of FIG. 26.
Figure 28:
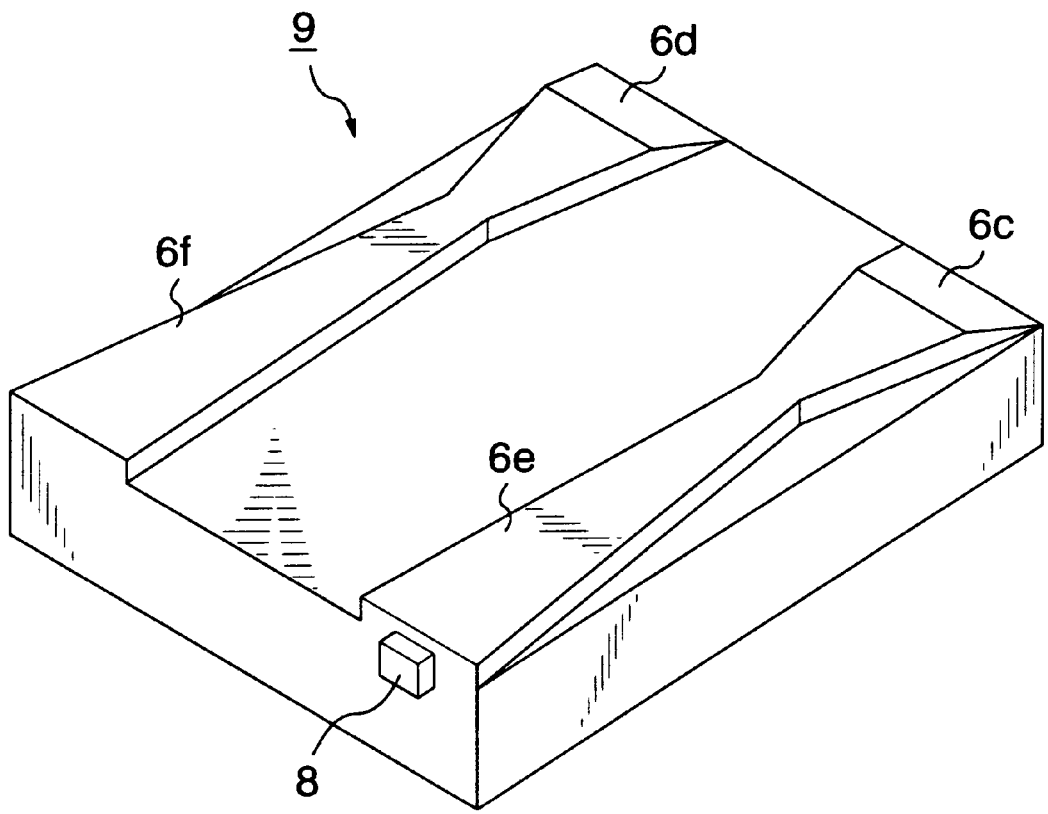
FIG. 28 is a schematic perspective view showing a modification of the conventional hovering-type head slider.

Curves B and C shown in FIGS. 19 through 21 respectively indicate the variation in the hovering distance and the variation in the roll amount when the conventional hovering-type head sliders 6 and 9, shown in FIGS. 24 and 28, are used as comparative examples.

Figure 17:
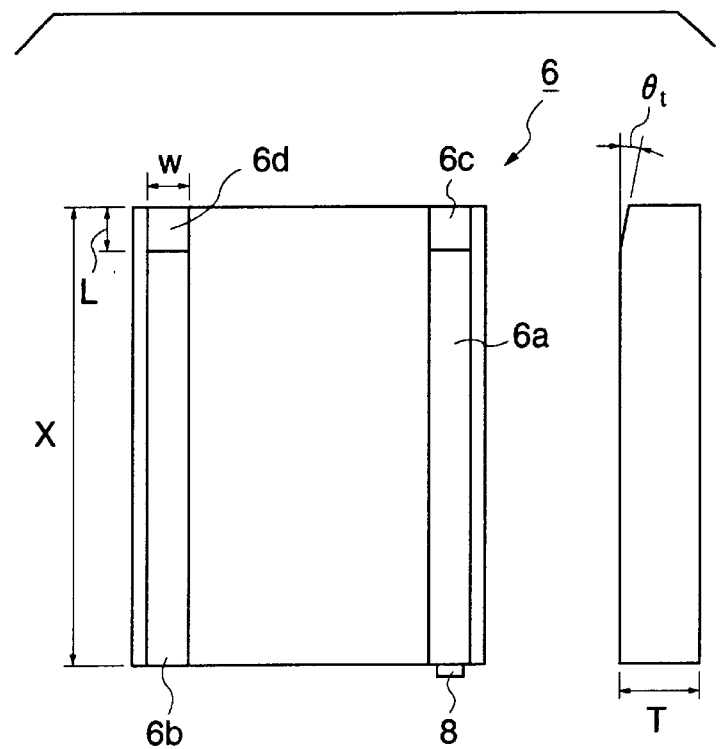
FIG. 17 is a schematic bottom view and side view showing a specific example of the formation of the conventional hovering-type head slider shown in FIG. 20.
Figure 18:
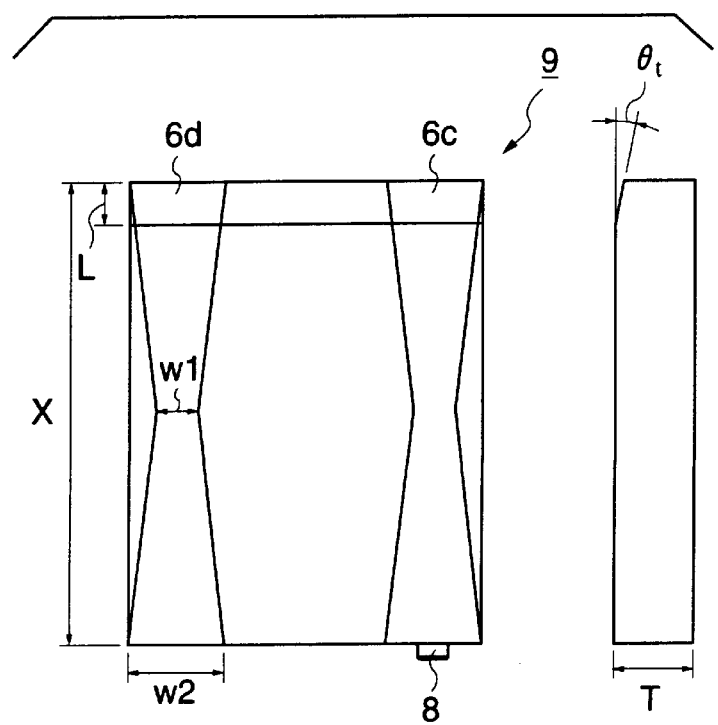
FIG. 18 is a schematic bottom view and side view showing a specific example of the formation of the conventional hovering-type head slider shown in FIG. 24.

As shown in FIG. 17, the hovering-type head slider 6 used has a slider length X of 2.05 mm, a slider thickness T of 0.43 mm, a taper length L of 0.2 mm, a taper angle θt of 0.5°, and a rail width W of 0.168 mm. As shown in FIG. 18, the rail width W1 in the middle portion with respect to the longitudinal dimension of the hovering-type head slider 9 is 0.1 mm, and the rail width W2 at the air flow inlet end and the air flow outlet end thereof is 0.40 mm. The depth D of the recessed portion between the rails of the hovering-type head slider 9 is 0.006 mm.

FIG. 19 shows the variation in the hovering distance when the linear velocity is varied from 6 m/s to 36 m/s at a skew angle θs of 0. By comparing the curves A, B and C with each other, it can be seen that, in the hovering-type head slider 80 of the present invention, the dependence on the linear velocity is at the lowest level, and the hovering-amount variation property is substantially flat.

FIG. 20 shows the variation in the hovering distance when the skew angle θs is varied from −15° to +15° at a linear velocity of 12 m/s. As indicated by curve A in FIG. 20, it can be seen that the variation in the hovering distance of the hovering-type head slider 80 due to the skew angle is relatively small.

FIG. 21 shows the variation in the roll amount when the skew angle θs is varied from −15° to +15° at a linear velocity of 12 m/s (that is, the difference in the hovering distance between the inner side IT and the outer side OT of the hovering-type head slider 80). It can be seen from the diagram that the hovering-type head slider 80 of the present invention has a variation the in roll amount larger than those of the conventional hovering-type head sliders 6 and 9 indicated by curves B and C, but that the difference is small and the variation is at a level which is insignificant from the viewpoint of practical use. In this case, the variation in the roll amount is computed as the difference in the hovering distance between the rear ends (the air flow output ends) of the right and left rails 81 and 82.

Thus, in the above-described hovering-type head slider 80, a reduction is achieved in terms of dependence on the linear velocity and on the skew angle, whereby a constant hovering property is obtained. At the same time, a variation in the roll amount is achieved which is so small as to be insignificant from the viewpoint of practical use.

While in the above embodiments the magnetic head is attached to the end surface at the air flow output end of one portion of the first rails 16, 21, 31, 41, 51, 61, 71 and 81, this should not be construed restrictively. It is obviously also possible for the magnetic head to be attached to the end surface at the air flow outlet end of the other portion of each of these rails.

Further, while in the above embodiments a tapered portion is provided at the edge at the air flow inlet end, it is obviously also possible to provide a step portion instead of the tapered portion in all the above embodiments. While in the hovering-type head sliders of the above embodiments 15, 20, 30, 40, 50, 60, 70 and 80 specific configurations and dimensions are given with respect to the width and length of the rails, the rails have only to extend longitudinally substantially parallel to each other and be branched from a branching position. As to the length, width and arrangement of the rails, they are to be optimized in correspondence with the hard disc deice on which the hovering-type head slider is mounted. Thus, the configurations, arrangements, etc. of the above-described embodiments should not be construed restrictively, and it goes without saying that a combination of these configurations, arrangements, etc. is possible.

Further, while the above embodiments have been described as applied to a hovering-type head slider for use in a hard disc drive device for performing recording and reproduction on and from a magnetic disc, this should not be construed restrictively. The present invention is obviously also applicable to a hovering-type head slider for use in a disc drive device using other types of disc, for example, a magneto-optical disc as the recording medium.

As described above, in accordance with the present invention, the variation in the static hovering distance is reduced as much as possible, whereby it is possible to provide a hovering-type head slider and a magnetic disc device in which it is possible to obtain a hovering distance which is constant with respect to the variation in the skew angle and the linear velocity.

What is claimed is:

1. A hovering-type head slider comprising:
   at least two rails serving as air bearing surfaces formed substantially in parallel to a surface opposed to a recording medium;
   a tapered portion or step portion provided on the air-flow inlet side of each rail; and
   a magnetic head provided on an end surface on the air-flow outlet side,
   wherein said rails are branched into at least two rail portions from a position near the center with respect to the direction of the air flow toward the air-flow outlet end.

2. A hovering-type head slider according to claim 1, wherein said rails have the same width.

3. A hovering-type head slider according to claim 1, wherein the width of one of outer and inner branch portions of said rails is larger than that of the other.

4. A hovering-type head slider according to claim 1, wherein said rails are formed so as to gradually increase in width from the branching position toward the air flow inlet end and the air flow outlet end.

5. A hovering-type head slider according to claim 1, wherein said magnetic head is attached to an end surface on the air flow outlet side of a branch portion of one of said rails.

6. A hovering-type head slider according to claim 5, wherein end portions on the air flow outlet side of one of outer and inner branch rail portions extend laterally toward the other rail portions to thereby form a land portion to carry a head.

7. A hovering-type head slider comprising:
   at least two rails serving as air bearing surfaces formed substantially in parallel to a surface opposed to a recording medium;
   a tapered portion or step portion provided on the air-flow inlet side of each rail; and
   a magnetic head provided on an end surface on the air-flow outlet side,
   wherein said rails are branched into at least two rail portions from a position near the center with respect to the direction of the air flow to a position near the air-flow inlet end.

8. A hovering-type head slider according to claim 7, wherein said rails have the same width.

9. A hovering-type head slider according to claim 7, wherein the width of one of outer and inner branch portions of said rails is larger than that of the other.

10. A hovering-type head slider according to claim 7, wherein said rails are formed so as to gradually increase in width from the branching position toward the air flow inlet end and the air flow outlet end.

11. A magnetic disc device comprising:
    a magnetic disc serving as a recording medium;
    driving means for rotating said magnetic disc;
    a rotary actuator supported so as to be swingable with respect to the magnetic disc rotated by the driving means;
    a hovering-type head slider provided at the forward end of the rotary actuator;
    a magnetic head provided on the hovering-type head slider and adapted to perform recording and reproduction on and from the magnetic disc; and
    a driving mechanism for swinging the rotary actuator,
    wherein said head slider comprises:
    at least two rails serving as air bearing surfaces formed substantially in parallel to a surface opposed to a recording medium;
    a tapered portion or step portion provided on the air-flow inlet side of each rail; and
    a magnetic head provided on an end surface on the air-flow outlet side,
    wherein said rails are branched into at least two rail portions from a position near the center with respect to the direction of the air flow toward the air-flow outlet end.

12. A magnetic disc device comprising:
    a magnetic disc serving as a recording medium;
    driving means for rotating said magnetic disc;
    a rotary actuator supported so as to be swingable with respect to the magnetic disc rotated by the driving means;
    a hovering-type head slider provided at the forward end of the rotary actuator;
    a magnetic head provided on the hovering-type head slider and adapted to perform recording and reproduction on and from the magnetic disc; and a driving mechanism for swinging the rotary actuator, wherein said head slider comprises:

at least two rails serving as air bearing surfaces formed substantially in parallel to a surface opposed to a recording medium;

a tapered portion or step portion provided on the air-flow inlet side of each rail; and a magnetic head provided on an end surface on the air-flow outlet side, wherein said rails are branched into at least two rail portions from a position near the center with respect to the direction of the air flow to a position near the air flow inlet end.

* * * * *